(12) United States Patent
Johnston et al.

(10) Patent No.: US 12,002,061 B2
(45) Date of Patent: Jun. 4, 2024

(54) SYSTEMS, APPARATUS, AND METHODS OF PROGRAMMATICALLY DETERMINING UNIQUE CONTACTS BASED ON CROWDSOURCED ERROR CORRECTION

(71) Applicant: ByteDance Inc., Wilmington, DE (US)

(72) Inventors: David Alan Johnston, Portola Valley, CA (US); Matthew Deland, San Francisco, CA (US); Shawn Jeffrey, Burlingame, CA (US); Taylor Raack, Chicago, IL (US)

(73) Assignee: ByteDance Inc., Wilmington, DE (US)

( * ) Notice: Subject to any disclaimer, the term of this patent is extended or adjusted under 35 U.S.C. 154(b) by 0 days.

(21) Appl. No.: 17/454,206

(22) Filed: Nov. 9, 2021

(65) Prior Publication Data
US 2022/0207540 A1 Jun. 30, 2022

Related U.S. Application Data

(63) Continuation of application No. 16/519,710, filed on Jul. 23, 2019, now Pat. No. 11,232,464, which is a continuation of application No. 14/788,488, filed on Jun. 30, 2015, now Pat. No. 10,410,225.

(60) Provisional application No. 62/019,211, filed on Jun. 30, 2014.

(51) Int. Cl.
*G06Q 30/00* (2023.01)
*G06F 16/00* (2019.01)
*G06F 16/2455* (2019.01)
*G06Q 30/0201* (2023.01)

(52) U.S. Cl.
CPC ... *G06Q 30/0201* (2013.01); *G06F 16/24558* (2019.01)

(58) Field of Classification Search
CPC ..... G06Q 10/00–50/00; G06Q 30/0201; G06F 16/24558
USPC ........................................................ 705/7.29
See application file for complete search history.

(56) References Cited

U.S. PATENT DOCUMENTS

| | | | |
|---|---|---|---|
| 6,523,019 B1 | 2/2003 | Borthwick | |
| 9,256,836 B2 | 2/2016 | Ludlow et al. | |
| 11,392,974 B2* | 7/2022 | Boccardi | G06Q 20/027 |
| 2004/0019593 A1 | 1/2004 | Borthwick et al. | |
| 2008/0005106 A1 | 1/2008 | Schumacher et al. | |
| 2009/0089630 A1 | 4/2009 | Goldenberg et al. | |
| 2011/0289026 A1 | 11/2011 | Kannan et al. | |
| 2015/0127419 A1 | 5/2015 | Tiwari et al. | |

(Continued)

*Primary Examiner* — Mustafa Iqbal
(74) *Attorney, Agent, or Firm* — ALSTON & BIRD LLP

(57) ABSTRACT

Systems, apparatus, and methods for determining unique contacts from a collection or pool of merchant data are discussed herein. Some embodiments may provide for an apparatus including circuitry configured to determine programmatic match results indicating whether different instances of merchant data match (e.g., describe the same contact). The circuitry may further determine probabilities of precision or recall errors with the programmatic match results. Programmatic match results having a high probability of error may be annotated by a user to generate user match results. The user match results may be used to generate a more reliable contacts database including unique contacts, as well as to train and/or update the match scoring algorithm. As such, the accuracy of machine-implemented binary classification is improved.

20 Claims, 10 Drawing Sheets

(56) References Cited

U.S. PATENT DOCUMENTS

2021/0312531 A1* 10/2021 McGinnis ............ G06Q 10/087
2022/0076306 A1* 3/2022 Toren ................. G06Q 30/0605

* cited by examiner

500

| | Merchant Data 1 (502) | Merchant Data 2 (504) |
|---|---|---|
| Name | Lenado Hotel | Hotel Lenado |
| Address Line 1 | 200 Aspen Street | 200 S Aspen St |
| Address Line 2 | Aspen, CA 81611, US | Aspen, CA 81611, US |
| Phone | 9709256246 | <not available> |
| Website | http://www.hotellenado.com/flash2.php | http://www.hotellenado.com |

| | Merchant Data 1 | Merchant Data 2 |
|---|---|---|
| Name | Cutifem Cosmetics | Rituals Cosmetics |
| Address Line 1 | Tauentzienstraße 9 | Tauentzienstraße 9 |
| Address Line 2 | Berlin, Berlin, 10789 | Berlin, Berlin, 10789 |
| Phone | 1805224260 | <not available> |
| Website | http://www.cutifem-cosmetics.de | http://www.rituals.com |

|  | Merchant Data 1 | Merchant Data 2 |
|---|---|---|
| Name | ANOVA HOTEL & SPA | Hotel Anova |
| Address Line 1 | Hameau de l'Obelisque | Hameau de l'Obelisque |
| Address Line 2 | Montgenèvre, PACA, FR 05100 | Montgenèvre, Provence-Alpes-Côte, FR 05100 |
| Phone | <not available> | 33(0)680 438 930 |
| Website | www.anova-hotel.com | http://www.anova-hotel.com |

| | Merchant Data 1 | Merchant Data 2 |
|---|---|---|
| Name | U-Spa Barrière | Hôtel Fouquet'S Barrière |
| Address Line 1 | 46 Avenue George V | 46 Avenue George V |
| Address Line 2 | Paris, Ile-de-France, FR 75008 | Paris, 75, FR 75008 |
| Phone | 0140696070 | 0140696000 |
| Website | http://www.fouquets-barriere.com/home.php?lang=fr | http://www.fouquets-barriere.com |

806 → (header row)
808 → Name
810 → Address Line 1
812 → Address Line 2
814 → Website
802 → Merchant Data 1 column
804 → Merchant Data 2 column

Fig. 8

SYSTEMS, APPARATUS, AND METHODS OF PROGRAMMATICALLY DETERMINING UNIQUE CONTACTS BASED ON CROWDSOURCED ERROR CORRECTION

CROSS REFERENCE TO RELATED APPLICATIONS

This application is a continuation application of U.S. Utility patent application Ser. No. 16/519,710, titled "Systems, Apparatus, And Methods Of Programmatically Determining Unique Contacts Based On Crowdsourced Error Correction," filed Jul. 23, 2019, which is a continuation application of U.S. Utility patent application Ser. No. 14/788,488, titled "Systems, Apparatus, And Methods Of Programmatically Determining Unique Contacts Based On Crowdsourced Error Correction," filed Jun. 30, 2015 (now U.S. patent application Ser. No. 10/410,225, issued Sep. 10, 2019), which claims the benefit of U.S. Provisional Patent Application No. 62/019,211, titled "Systems, Apparatus, And Methods Of Programmatically Determining Unique Contacts Based On Crowdsourced Error Correction," filed Jun. 30, 2014, each of which is are incorporated by reference herein in its their entirety.

FIELD

Embodiments of the invention relate, generally, to determining unique contacts from data.

BACKGROUND

Businesses or other entities may communicate with users, individuals, customers, vendors, component manufacturers, merchants, etc. for various purposes. An organization that solicits business may use contact lists to organize and manage such communications. Computer systems may facilitate the management of contacts, such by providing electronic contact data or lists that can be shared within members of the organization. Through applied effort, ingenuity, and innovation, solutions to improve such systems have been realized and are described herein.

BRIEF SUMMARY

Systems, methods, and computer readable program code are provided to, in general, improve the management of contacts. For example, some embodiments may provide techniques for determining unique contacts from a pool (e.g., a database) of merchant data, where each instances of merchant data is associated with a merchant that may or may not be duplicated within the pool of merchant data. Some embodiments may provide for an apparatus (e.g., one or more servers) including circuitry configured to: determine a programmatic match result indicating whether first merchant data is a match with second merchant data by applying a match score algorithm to the first merchant data and second merchant data; determine an error score associated with the match result; determine whether the error score indicates a probable error; in response to determining that the error score indicates a probable error: determine a user match result based on received user input; and generate a merchant data training set including the user match result, the first merchant data, and the second merchant data; and apply the merchant data training set to train the match score algorithm, thereby improving accuracy of machine-implemented binary classification.

In some embodiments, the circuitry may be further configured to update a contacts database based on the match result.

In some embodiments, the circuitry configured to apply the merchant data training set to train the match score algorithm may include the circuitry being configured to determine an updated relationship between (1) similarity scores of attributes of the first merchant data and second merchant data and (2) match scores.

In some embodiments, the circuitry may be configured to, in response to determining that the first merchant data is a match with the second merchant data, determine the error score associated with the match result as a precision error score. The circuitry configured to determine whether the error score indicates a probable error may include the circuitry being configured to determine whether the precision error score indicates a probable precision error.

In some embodiments, the circuitry configured to determine the recall error score includes the circuitry being configured to determine a probabilistic estimate of how likely the first merchant data matches to one or more other instances of merchant data different from the second merchant data.

In some embodiments, the circuitry is configured to determine whether to request the user match result based on: a merchant score indicating an importance associated with at least one of the first merchant data and the second merchant data; a user correction probability score indicating an estimate of a probability that a human can correct the error.

In some embodiments, the circuitry is configured to determine whether to request the user match result based on: a merchant score indicating an importance associated with at least one of the first merchant data and the second merchant data; and a user correction probability score indicating an estimate of a probability that a human can correct the error.

Some embodiments may provide for a machine-implemented method. The method may include: determining, by circuitry of an apparatus, a programmatic match result indicating whether first merchant data is a match with second merchant data by applying a match score algorithm to the first merchant data and second merchant data; determine an error score associated with the match result; determining whether the error score indicates a probable error; in response to determining that the error score indicates a probable error: determining a user match result based on received user input; and generating a merchant data training set including the user match result, the first merchant data, and the second merchant data; and applying the merchant data training set to train the match score algorithm, thereby improving accuracy of machine-implemented binary classification.

Some embodiments may additionally or alternatively provide for an apparatus including circuitry configured to: determine a programmatic match result indicating whether first merchant data is a match with second merchant data by applying a match score algorithm to the first merchant data and second merchant data, the match score algorithm including a match score threshold; in response to determining that the first merchant data is a match with the second merchant data: determine a precision error score indicating whether the programmatic match result includes a precision error; in response to determining that the precision error score indicates the programmatic match result includes a precision error, determine a user match result based on received user input; determine a second programmatic match result indicating whether third merchant data is a match with fourth merchant data by applying the match score algorithm to the third merchant data and fourth merchant data; in response to determining that the third merchant data fails to be a match with the fourth merchant data: determine a recall error score indicating whether the second programmatic match result includes a recall error; in response to determining that the precision error score indicates the second programmatic match result includes a recall error, determine a second user match result based on received second user input; determine a precision error rate based at least in part on the programmatic match result and the user match result; determine a recall error rate based at least in part on the second programmatic match result and the second user match result; determine an estimated precision/recall error ratio based on the precision error rate and the recall error rate; determine an expected precision/recall error ratio; determine an updated match score threshold such that the estimated precision/recall error ratio matches the expected precision/recall error ratio; and adjust the match score threshold of the match algorithm to the updated match score threshold, thereby improving accuracy of machine-implemented binary classification.

In some embodiments, the circuitry may be further configured to update a contacts database based on the user match result.

In some embodiments, the circuitry configured to determine the updated match score threshold may include the circuitry being configured to adjust the match score threshold a predetermined amount.

In some embodiments, the circuitry configured to determine the updated match score threshold such that the estimated precision/recall error ratio matches the expected precision/recall error ratio may include the circuitry being configured to incrementally adjust the match score threshold by a predetermined amount.

In some embodiments, the circuitry may be configured to incrementally increase the match score threshold in response to determining that the expected precision/recall error ratio exceeds the estimated precision/recall error ratio.

In some embodiments, the circuitry is configured to incrementally decrease the match score threshold in response to determining that the estimated precision/recall error ratio exceeds the expected precision/recall error ratio.

In some embodiments, the circuitry configured to determine the updated match score threshold such that the estimated precision/recall error ratio matches the expected precision/recall error ratio may include the circuitry being configured to use one or more of: gradient descent, simulated annealing, or Newton's method.

In some embodiments, the circuitry configured to determine the updated match score threshold such that the estimated precision/recall error ratio matches the expected precision/recall error ratio may include the circuitry being configured to utilize an optimization procedure to minimize a difference between the estimated p/r error ratio and the expected p/r error ratio as a function of the match score threshold.

In some embodiments, the circuitry configured to determine the expected precision/recall error ratio may include the circuitry being configured to minimize a cost value as function of the precision error rate and recall error rate.

Some embodiments may provide for a machine-implemented method. The method may include: determining, by circuitry, a programmatic match result indicating whether first merchant data is a match with second merchant data by applying a match score algorithm to the first merchant data and second merchant data, the match score algorithm including a match score threshold; in response to determining that the first merchant data is a match with the second merchant data: determining a precision error score indicating whether the programmatic match result includes a precision error; in response to determining that the precision error score indicates the programmatic match result includes a precision error, determining a user match result based on received user input; determining a second programmatic match result indicating whether third merchant data is a match with fourth merchant data by applying the match score algorithm to the third merchant data and fourth merchant data; in response to determining that the third merchant data fails to be a match with the fourth merchant data: determining a recall error score indicating whether the second programmatic match result includes a recall error; in response to determining that the precision error score indicates the second programmatic match result includes a recall error, determining a second user match result based on received second user input; determining a precision error rate based at least in part on the programmatic match result and the user match result; determining a recall error rate based at least in part on the second programmatic match result and the second user match result; determining an estimated precision/recall error ratio based on the precision error rate and the recall error rate; determining an expected precision/recall error ratio; determining an updated match score threshold such that the estimated precision/recall error ratio matches the expected precision/recall error ratio; and adjusting the match score threshold of the match algorithm to the updated match score threshold, thereby improving accuracy of machine-implemented binary classification.

Some embodiments may include one or more machines, such as an apparatus and/or system, configured to implement the methods and/or other functionality discussed herein. For example, the machine may include one or more processors and/or other machine components configured to implement the functionality discussed herein based on instructions and/or other data stored in memory and/or other non-transitory computer readable media.

These characteristics as well as additional features, functions, and details are described below. Similarly, corresponding and additional embodiments are also described below.

BRIEF DESCRIPTION OF THE DRAWINGS

Figure 1:
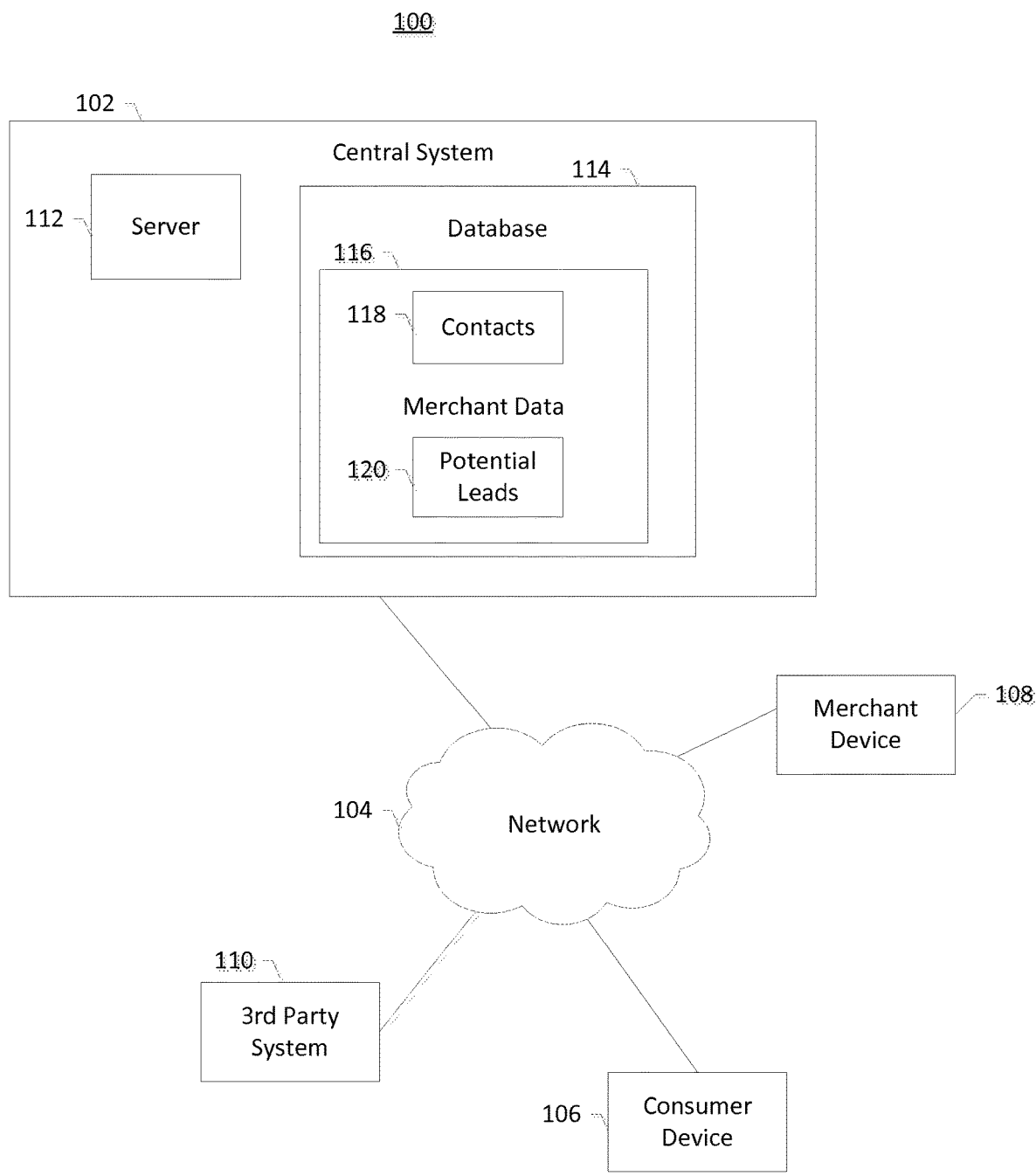
Figure 2:
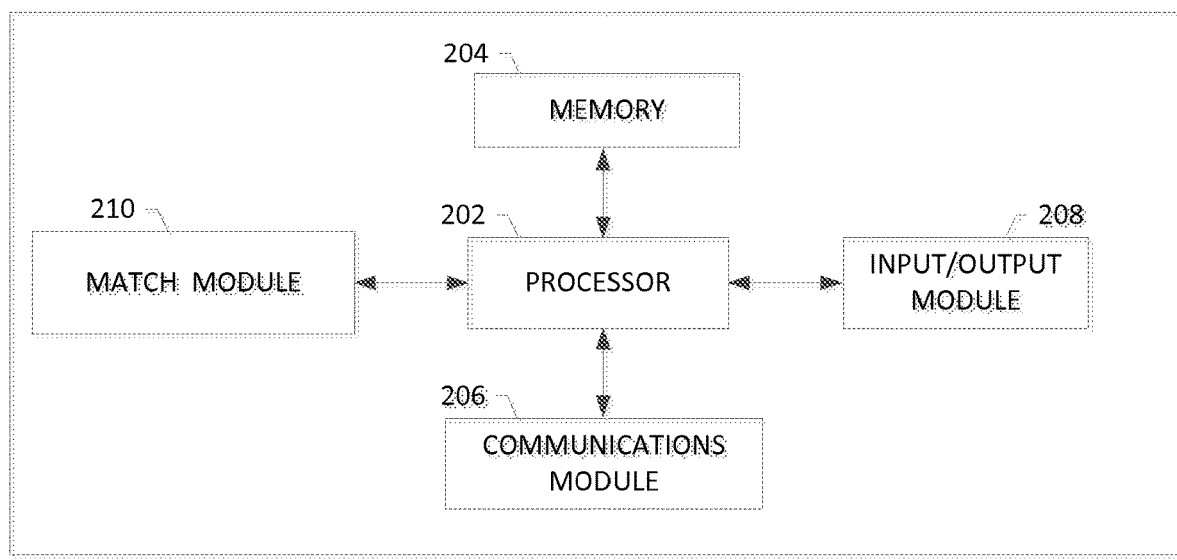

Having thus described some embodiments in general terms, reference will now be made to the accompanying drawings, which are not necessarily drawn to scale, and wherein:

FIG. 1 shows an example of a system in accordance with some embodiments;

FIG. 2 shows a schematic block diagram of an example of circuitry in accordance with some embodiments.

Figure 3:
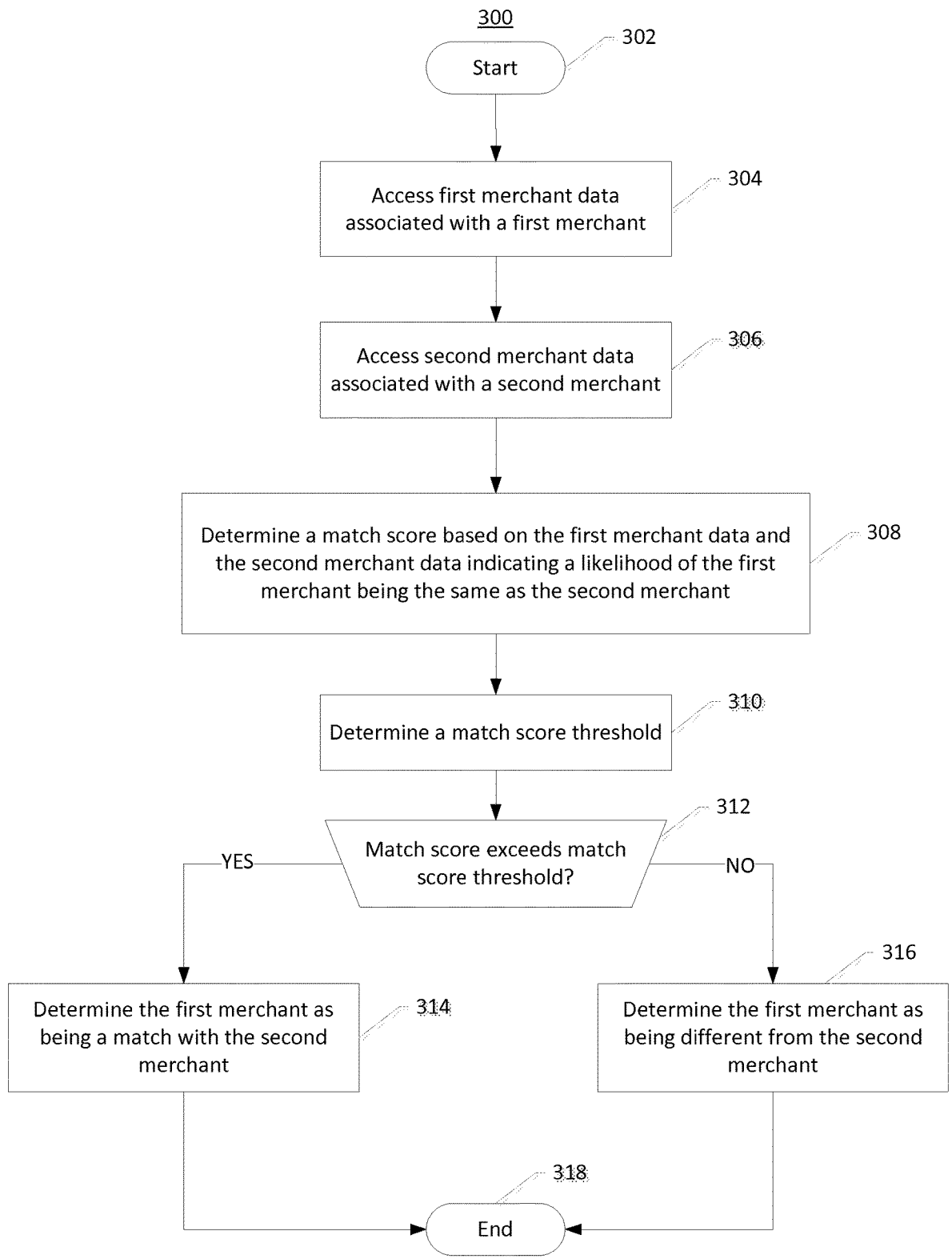
Figure 4:
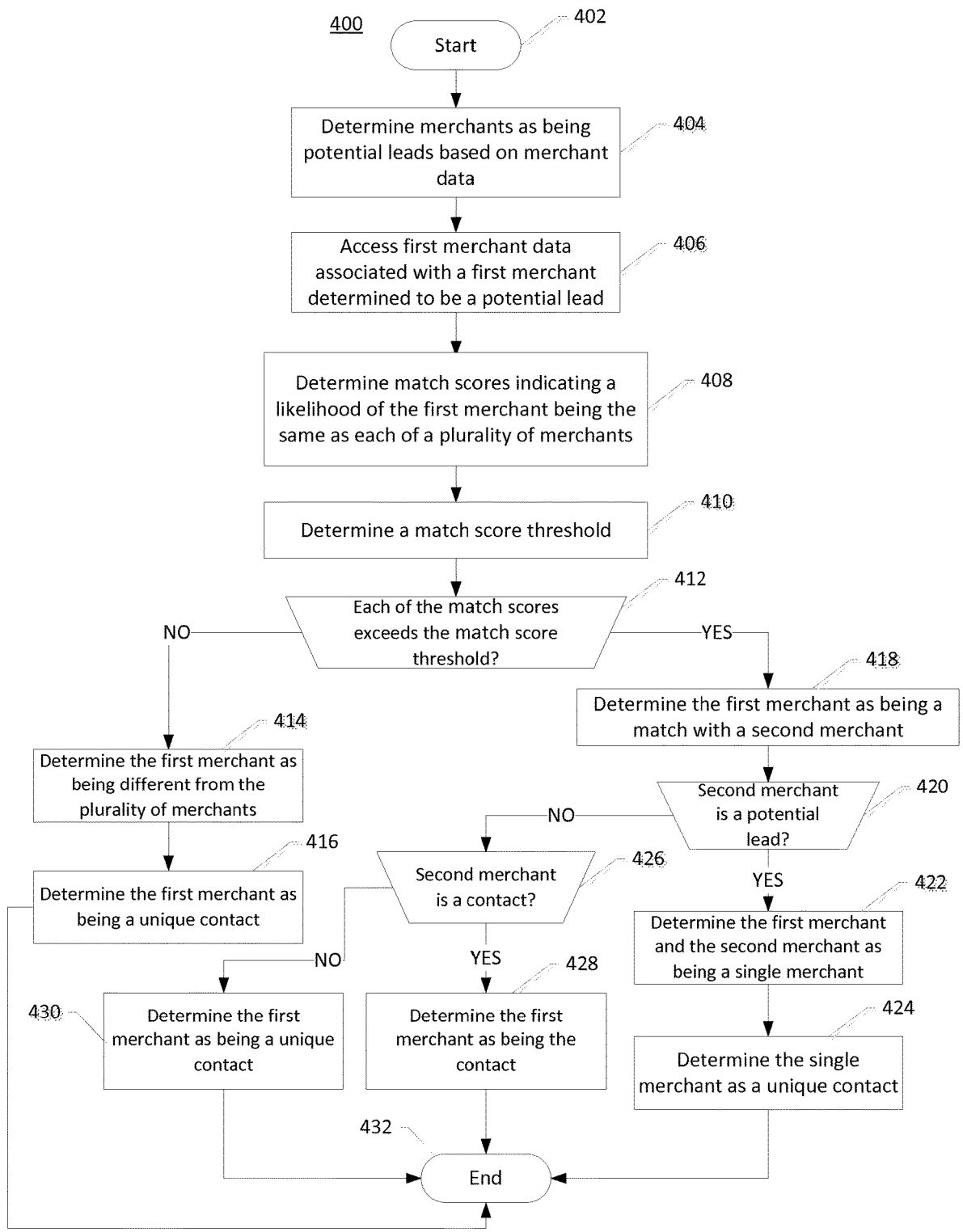
Figure 9:
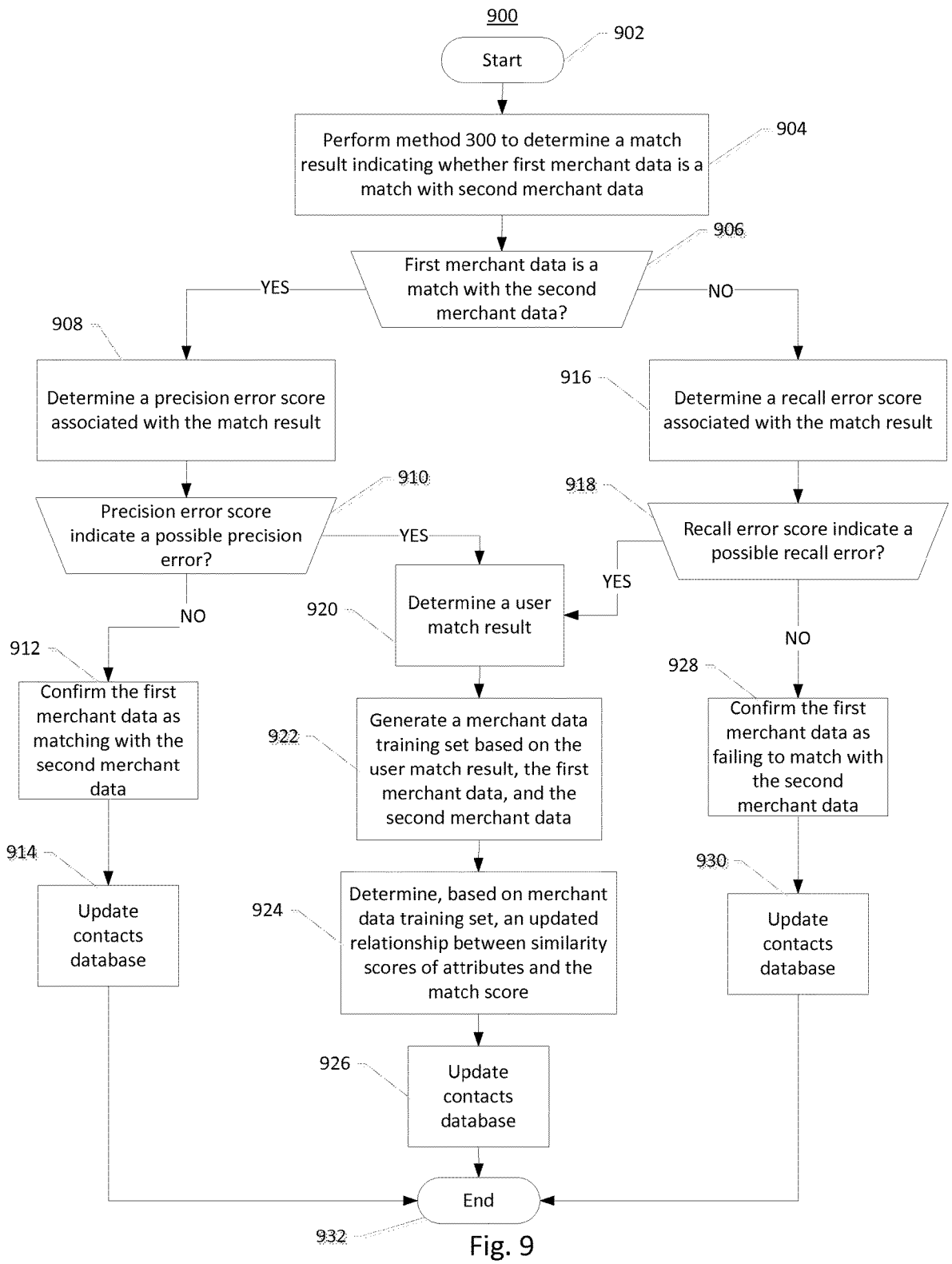
Figure 10:
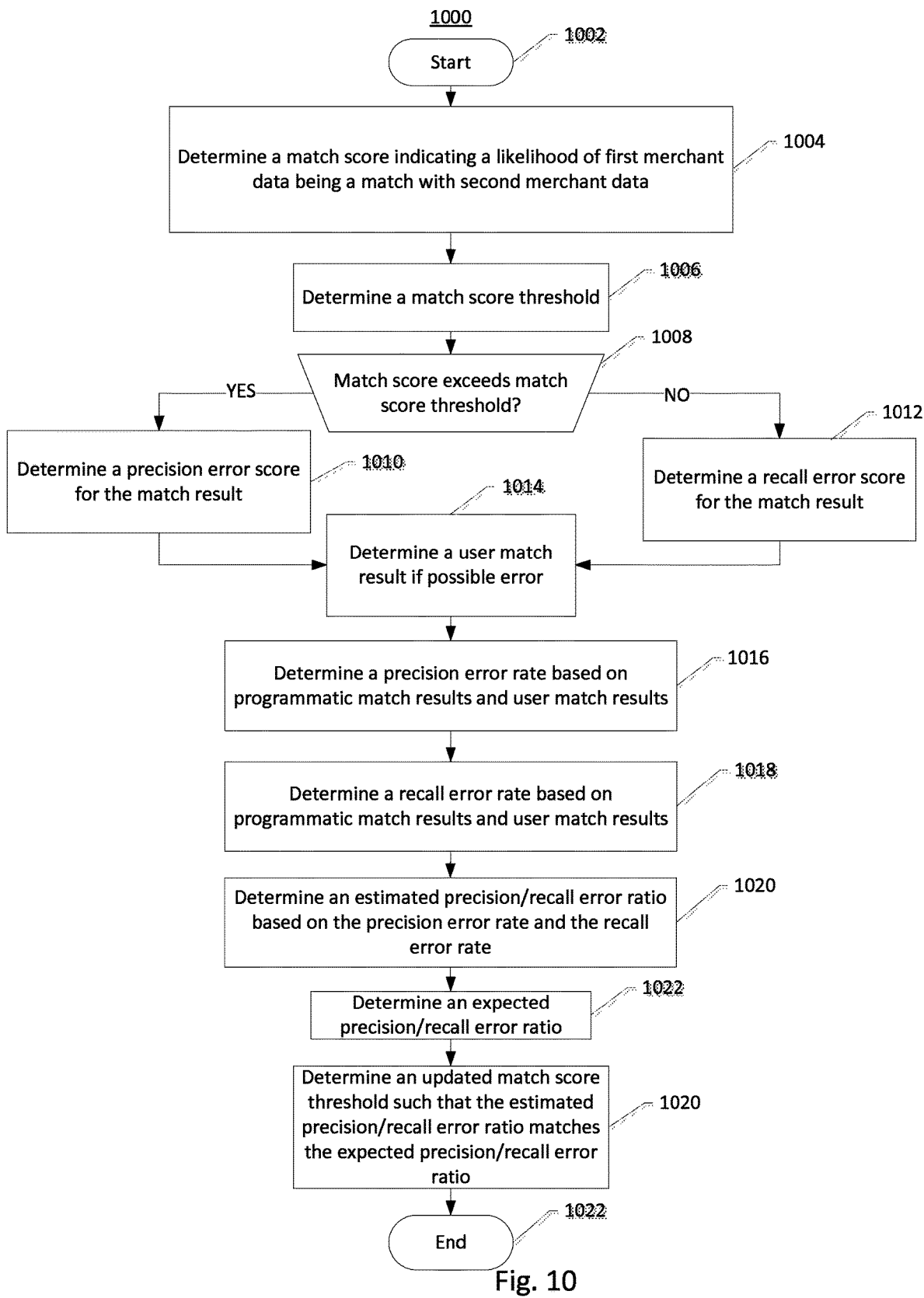

FIG. 3 shows an example of a method of determining whether two instances of merchant data are associated with the same merchant in accordance with some embodiments;

FIG. 4 shows an example of a method of determining a unique contact in accordance with some embodiments;

FIGS. 5-8 show examples of merchant data in accordance with some embodiments;

FIG. 9 shows an example of a method of error detection and user correction for a programmatic match result in accordance with some embodiments; and FIG. 10 shows an example of a method of determining a match score threshold based on error detection and user correction in accordance with some embodiments.

DETAILED DESCRIPTION

Embodiments now will be described more fully hereinafter with reference to the accompanying drawings, in which some, but not all embodiments are shown. Indeed, embodiments of the invention may be implemented in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like. Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

Where techniques are described herein with method flowcharts, it is appreciated that the steps of a method may not necessarily be performed in the order shown. Furthermore, in various embodiments, some or all of the steps of a method flowchart may not necessarily be performed.

Overview

Some embodiments may provide for a system capable of determining unique contacts from a collection of merchant data. For example, the data may include data associated with a merchant, or merchant data. The merchant data may include, for example, identification data (e.g., name), contact data (e.g., phone number, website, email), address data (e.g., street address, city, state, country, zip code, etc.), among other things. A "merchant" may include, but is not limited to, a merchant, provider of a promotion, business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce. It is appreciated while various embodiments discussed herein refer to merchant data or merchants, the techniques discussed herein may also be applicable to non-merchant data or other objects or entities. For example, the system may be configured to determine one or more unique objects from object data indicating properties or attributes of the multiple objects.

Some embodiments may provide for programmatic entity resolution. For example, two databases of data representing items, objects, things, items, etc. may be merged with the desire to not introduce duplicate items into the original or target database. An advantage that may be realized by some embodiments discussed herein is that high quality merchant data may be maintained by a system, such as within a database. The system may be configured to ingest data from multiple sources and resolve information from different sources into a single canonical entities, or unique contacts. In some embodiments, each unique contact may be placed in a contacts database such that a sales team or the like can access the non-duplicated data. The contacts database may be merged (e.g., on a schedule basis or otherwise) with a general pool of merchant data for updates, modifications, etc. while each contact is kept unique via the entity resolution.

In some embodiments, for two instances of merchant data, the system may be configured to determine a match score indicating a likelihood of two instances of merchant data as describing and/or otherwise being associated with the same merchant. The match score may be compared with a match score threshold to determine whether the two instances of merchant data match or not (e.g., a "match result"). In some embodiments, potential leads may be identified from merchant data and compared with other merchant data to determine whether the potential lead is a unique contact. Some embodiments may further provide for techniques of determining match scores from input merchant data based on machine learning with merchant data training sets.

Some embodiments may provide for techniques for training the programmatic entity resolution. For example, likely or probable errors in recall and precision from programmatic match results may be sent to a user for user match result determination. The user match result may then be used in lieu of the programmatic match result (e.g., for updating a contacts database) if the two results disagree. The user match result, along with the instances of merchant data being compared, may also be used to generate a merchant data training set. Additionally or alternatively, recall and precision error rates may be determined over time, and the system may be configured to adjust the programmatic entity resolution to achieve an optimized or desirable ratio of recall errors to precision errors, such as to minimize a cost function.

Exemplary System Architecture

FIG. 1 shows an example system 100 in accordance with some embodiments. System 100 may include central system 102 (or "system 102"), network 104, consumer device 106, merchant device 108, and third party system 110. System 102 may be communicably connected with consumer device 106 and merchant device 108 via network 104. System 102 may include server 112 and database 114.

Server 112 may include circuitry, networked processors, or the like configured to perform some or all of the server-based processes described herein and may be any suitable network server and/or other type of processing device. In some embodiments, system 102 may function as a "cloud" with respect to the consumer device 106 and/or merchant device 108. In that sense, server 112 may include several servers performing interconnected and/or distributed functions. To avoid unnecessarily overcomplicating the disclosure, server 112 is shown and described herein as a single server.

Database 114 may be any suitable network storage device configured to store some or all of the information described herein. For example, database 114 may be configured to store merchant data associated with merchants, among other things. As such, database 114 may include, for example, one or more database systems, backend data servers, network databases, cloud storage devices, etc. To avoid unnecessarily overcomplicating the disclosure, database 114 is shown and described herein as a single database. In some embodiments, database 114 may be a centralized database of merchants, brands, and/or places of business that are known to system 102. In that sense, each merchant known to system 102 may correspond with one or more instances of merchant data 116 within database 114.

In some embodiments, system 102 may include contacts database 118, which may be included with database 114 or separate. Contact database 118 may include merchant data associated with merchants that are known contacts and/or unique contacts. Contacts database 118 may be accessed, for example, by a member of a sales team or other operator that is responsible for contacting or otherwise interfacing with merchants. In some embodiments, contacts database 118 may be accessed for customer relationship management (CRM). For each merchant within contacts database 118, an operator may be allowed to track communications, record contractual details or other business activity (e.g., promotions provided by the system on behalf of the merchant), track promotion performance, among other things.

In some embodiments, system 102 may be configured to maintain selective consistency between database 114 and contacts database 118. For example, a merchant within database 114 that is contacted by a member of the sales team or other operator may be added to contacts database 118. Furthermore, when merchant data associated with a new merchant is added to contacts database 118, the merchant data may also be (e.g., automatically) added to database 114. In some embodiments, for a particular merchant, an update in one of database 114 or contacts database 118 may be propagated to the other. In that sense, both database 114 and contacts database 118 may be kept up-to-date and accurate.

In some embodiments, system 102 may include potential leads 120. Potential leads 120 may include merchant data of merchants selected from database 118 (e.g., a subset of merchant data 116). As discussed in greater detail below, selected merchants may include merchants that are determined to be of high value and/or otherwise suitable for contact. In some embodiments, a potential lead may be determined without determining the value or suitability of the merchant, such as based on the merchant data of the potential lead being found within merchant data 116 but not found within contacts database 118. In some embodiments, merchant data that exists within contacts database 118 may be excluded or filtered from the merchant data within potential leads 118 to avoid duplication between known contacts and potential leads (e.g., that may be candidates for inclusion within contacts database 118).

In some embodiments, as discussed in greater detail below, server 112 may be configured to perform entity resolution to determine whether a potential lead is found within contacts database 118. For example, merchant data associated with the potential lead may be compared with merchant data of each contact within contact database 118 to determine match scores. A match score may indicate a likelihood of the potential lead being the same merchant as a contact. For example, some embodiments, the match score may be scaled from 0 to 1, with 0 being highest mismatch and 1 being highest (e.g., complete) match, for two instances of input merchant data being compared. In some embodiments, the match score may be determined based on statistical machine learning with merchant data training sets. For example, merchant data training sets, each including two instances of merchant data, may be input into a radial basis function support vector machine algorithm, along with an indication of whether the merchant data training set is an example of a match or mismatch. The radial basis function support vector machine algorithm may be configured to, based on the merchant data training sets, determine a non-linear boundary for the merchant data. Alternatively or additionally, a non-radial basis vector support machine algorithm may be used, such as a linear vector support machine algorithm, and/or other machine learning and/or classifier algorithms may be used.

When a potential lead is determined to be a unique merchant from the merchants of contact database 118, for example, merchant data of the merchant may be added or injected to contact database 118. Similarly, when the potential lead is determined to match a merchant of contact database 118, the merchant data may not be added or injected to avoid duplication of the merchant within contact database 118.

Network 104 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (such as, e.g., network routers, switches, hubs, etc.). For example, network 104 may include a cellular telephone, mobile broadband, long term evolution (LTE), GSM/EDGE, UMTS/HSPA, IEEE 802.11, IEEE 802.16, IEEE 802.20, WiFi, dial-up, and/or WiMax network. Furthermore, network 104 may include a public network, such as the Internet, a private network, such as an intranet, or combinations thereof, and may utilize a variety of networking protocols now available or later developed including, but not limited to TCP/IP based networking protocols.

Consumer device 106 may be associated with a consumer and/or consumer account, such as a consumer with a consumer account provided by system 102. Although a single consumer device 106 is shown, system 100 may include any number of consumer devices that may be associated with various other consumers and/or consumer accounts. Consumer device 106 may be a mobile device and/or a stationary device. For example, consumer device 106 may be a mobile device such as a cellular telephone (including smartphones and/or other types of mobile telephones), laptop, tablet, electronic reader, e-book device, media device, and/or the like. Additionally and/or alternatively, consumer device 106 may be a stationary device such as a desktop computer, work station, point-of-sale device, or the like.

Merchant device 108 may be associated with a merchant, and may be located at a merchant shop and/or other location. Although a single merchant device 108 is shown, system 100 may include any number of merchant devices that may be associated with various other merchants. In some embodiments, merchant device 108 may be configured to provide point-of-sale (POS) functionality for the merchant, such as at the merchant's shop. Furthermore, merchant device 108 may be a stationary and/or mobile device.

In some embodiments, system 102 may be configured to provide promotional services on behalf of merchants. For example, system 102 may receive promotion data from merchant device 108 indicating a promotion for goods, experiences and/or services (or "items" as used herein) and/or one or more promotion parameters of the promotion (e.g., target audience, timing, accepted value, promotional value, residual value, etc.). Based on the promotion data or otherwise, system 102 may then generate and/or provide one or more impressions for the promotion to consumer device 102, which may be redeemed with the merchant via merchant device 108, such as in connection with a financial transaction or otherwise. In some embodiments, system 102 may be configured to manage its contacts with merchants and merchant information to facilitate the procurement and management of promotional services and/or other services on behalf of the merchant.

In some embodiments, system 100 may further include one or more third party systems 110, among other things. For example, third party system 110 may include a payment server configured to provide for the exchange of money, credits, etc. between the merchant and consumer. In some embodiments, various third party systems 110 may be associated with different types of payment sources. Thus for each payment source, data may be sent to an appropriate third party system (e.g., a credit card transaction server, etc.) to validate and/or process payments.

FIG. 2 shows a schematic block diagram of example circuitry 200, some or all of which may be included in system 102, server 112, database 114, consumer device 106, and/or merchant device 108. In accordance with some example embodiments, circuitry 200 may include various means, such as one or more processors 202, memories 204, communications modules 206, and/or input/output modules 208.

In some embodiments, such as when circuitry 200 is included in server 112 or other device and/or apparatus configured to determine unique contacts, match module 210 may also or instead be included. As referred to herein, "module" includes hardware, software and/or firmware configured to perform one or more particular functions. In this regard, the means of circuitry 200 as described herein may be embodied as, for example, circuitry, hardware elements (e.g., a suitably programmed processor, combinational logic circuit, integrated circuit, and/or the like), a computer program product comprising computer-readable program instructions stored on a non-transitory computer-readable medium (e.g., memory 204) that is executable by a suitably configured processing device (e.g., processor 202), or some combination thereof.

Processor 202 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments, processor 202 may comprise a plurality of processing means. The plurality of processing means may be embodied on a single computing device or may be distributed across a plurality of computing devices collectively configured to function as circuitry 200. The plurality of processing means may be in operative communication with each other and may be collectively configured to perform one or more functionalities of circuitry 200 as described herein. In an example embodiment, processor 202 may be configured to execute instructions stored in memory 204 or otherwise accessible to processor 202. These instructions, when executed by processor 202, may cause circuitry 200 to perform one or more of the functionalities described herein.

Whether configured by hardware, firmware/software methods, or by a combination thereof, processor 202 may comprise an entity capable of performing operations according to embodiments discussed herein while configured accordingly. Thus, for example, when processor 202 is embodied as an ASIC, FPGA or the like, processor 202 may comprise specifically configured hardware for conducting one or more operations described herein. As another example, when processor 202 may be embodied as an executor of instructions, such as may be stored in memory 204, the instructions may specifically configure processor 202 to perform one or more algorithms, methods or operations described herein. For example, processor 202 may be configured to execute operating system applications, firmware applications, media playback applications, media editing applications, among other things.

Memory 204 may comprise, for example, volatile memory, non-volatile memory, or some combination thereof. Although illustrated in FIG. 2 as a single memory, memory 204 may comprise a plurality of memory components. The plurality of memory components may be embodied on a single computing component or distributed across a plurality of computing components. In various embodiments, memory 204 may comprise, for example, a hard disk, random access memory, cache memory, flash memory, a compact disc read only memory (CD-ROM), solid state memory, digital versatile disc read only memory (DVD-ROM), an optical disc, circuitry configured to store information, integrated circuitry, chemical/biological memory, paper, or some combination thereof. Memory 204 may be configured to store information, data, applications, instructions, or the like for enabling circuitry 200 to carry out various functions in accordance with example embodiments discussed herein. For example, in at least some embodiments, memory 204 may be configured to buffer input data for processing by processor 202. Additionally or alternatively, in at least some embodiments, memory 204 may be configured to store program instructions for execution by processor 202 and/or data for processing by processor 202. Memory 204 may store information in the form of static and/or dynamic information. This stored information may be stored and/or used by circuitry 200 during the course of performing its functionalities.

Communications module 206 may be embodied as any component or means embodied in circuitry, hardware, a computer program product comprising computer readable program instructions stored on a computer readable medium (e.g., memory 204) and executed by a processing device (e.g., processor 202), or a combination thereof that is configured to receive and/or transmit data from/to another device, such as, for example, a second circuitry 200 and/or the like. In some embodiments, communications module 206 (like other components discussed herein) can be at least partially embodied as or otherwise controlled by processor 202. In this regard, communications module 206 may be in communication with processor 202, such as via a bus. Communications module 206 may include, for example, an antenna, a transmitter, a receiver, a transceiver, network interface card and/or supporting hardware and/or firmware/software for enabling communications. Communications module 206 may be configured to receive and/or transmit any data that may be stored by memory 204 using any protocol that may be used for communications. Communications module 206 may additionally and/or alternatively be in communication with the memory 204, input/output module 208 and/or any other component of circuitry 200, such as via a bus. Communications module 206 may be configured to use one or more communications protocols such as, for example, short messaging service (SMS), Wi-Fi (e.g., a 802.11 protocol, Bluetooth, etc.), radio frequency systems (e.g., 900 MHz, 1.4 GHz, and 5.6 GHz communication systems), infrared, GSM, GSM plus EDGE, CDMA, quad-band, and other cellular protocols, VOIP, or any other suitable protocol Input/output module 208 may be in communication with processor 202 to receive an indication of an input and/or to provide an audible, visual, mechanical, or other output. In that sense, input/output module 208 may include means for performing analog-to-digital and/or digital-to-analog data conversions. Input/output module 208 may include support, for example, for a display, touch screen, keyboard, button, click wheel, mouse, joystick, an image capturing device, microphone, speaker, biometric scanner, and/or other input/output mechanisms. In embodiments where circuitry 200 may be implemented as a server or database, aspects of input/output module 208 may be reduced as compared to embodiments where circuitry 200 may be implemented as an end-user machine or other type of device designed for complex user interactions. In some embodiments (like other components discussed herein), input/output module 208 may even be eliminated from circuitry 200. Alternatively, such as in embodiments wherein circuitry 200 is embodied as a server or database, at least some aspects of input/output module 208 may be embodied on an apparatus used by a user that is in communication with circuitry 200. Input/output module 208 may be in communication with memory 204, communications module 206, and/or any other component(s), such as via a bus. Although more than one input/output module and/or other component can be included in circuitry 200, only one is shown in FIG. 2 to avoid overcomplicating the disclosure (e.g., like the other components discussed herein).

In some embodiments, match module 210 may also or instead be included and configured to perform the functionality discussed herein related to managing contacts and determining unique contacts. In some embodiments, some or all of the functionality of match module 210 may be performed by processor 202. In this regard, some or all of the example processes and algorithms discussed herein can be performed by at least one processor 202 and/or match module 210. For example, non-transitory computer readable storage media can be configured to store firmware, one or more application programs, and/or other software, which include instructions and other computer-readable program code portions that can be executed to control processors of the components of system 200 to implement various operations, including the examples shown herein. As such, a series of computer-readable program code portions may be embodied in one or more computer program products and can be used, with a device, server, database, and/or other programmable apparatus, to produce the machine-implemented processes discussed herein.

Any such computer program instructions and/or other type of code may be loaded onto a computer, processor or other programmable apparatus's circuitry to produce a machine, such that the computer, processor other programmable circuitry that executes the code may be the means for implementing various functions, including those described herein. In some embodiments, one or more external systems (such as a remote cloud computing and/or data storage system) may also be leveraged to provide at least some of the functionality discussed herein.

As described above and as will be appreciated based on this disclosure, various embodiments may be implemented as methods, mediums, devices, servers, databases, systems, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD/DVD-ROMs, flash memory, optical storage devices, quantum storage devices, chemical storage devices, biological storage devices, magnetic storage devices, etc.

Embodiments have been described above with reference to block diagrams of components, such as functional modules, system components and circuitry. Below is a discussion of an example process flowcharts describing functionality that may be implemented by one or more components discussed above. Each block of the block diagrams and process flowcharts, and combinations of blocks diagrams and process flowcharts, respectively, can be implemented by various means including computer program instructions. These computer program instructions may be loaded onto a general purpose computer, special purpose computer, or other programmable data processing apparatus, such as processor 202, to produce a machine, such that the computer program product includes the instructions which execute on the computer or other programmable data processing apparatus to create a means for implementing the functions specified in the flowchart block or block diagrams.

These computer program instructions may also be stored in a computer-readable storage device (e.g., memory 204) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the block diagrams and process flowcharts, and combinations of blocks in the block diagrams and process flowcharts, can be implemented by special purpose hardware-based computer systems that perform the specified functions or steps, or combinations of special purpose hardware and computer instructions.

Determining Unique Contacts

FIG. 3 shows an example of a method of determining whether two instances of merchant data are associated with the same merchant in accordance with some embodiments. Method 300 may be used to provide entity resolution. For example, in some embodiments, a match score may be determined for two instances of merchant data indicating likelihood that the two instances of merchant data describe the same merchant. Based on the match score (e.g., via a comparison with a match score threshold), the two instances of merchant data may be determined to describe the same merchant, or not. In another example, by performing comparisons and determining match scores for merchant data within a pool of merchant data (e.g., merchant data 116 within database 114), unique merchants from the pool of merchant data may be determined (e.g., and added to contacts database 118.

Method 300, as well as the other methods herein, is discussed as being performed by a server (e.g., server 112 of system 102 including database 114). However, in some embodiments, other suitable structures that can be suitably configured to perform method 300 can be used including circuitry, devices, apparatuses, networks, and/or among other things.

Method 300 may begin at 302 and proceed to 304, where a server may be configured to access first merchant data associated with a first merchant. For example, the first merchant data may be a record of merchant data 116 stored in database 114. In some embodiments, the first merchant data may be accessed in response to determining that the first merchant is a potential lead. Additionally or alternatively, the first merchant data may be accessed from potential leads 120 as a potential lead for consideration as being a unique contact that can be added to contacts database 118.

At 306, the server may be configured to access second merchant data associated with a second merchant. The second merchant data may be a second record of merchant data 116 stored in database 114. Additionally or alternatively, the second merchant may be a unique merchant stored in contacts 118. In another example, the second merchant may be a second potential lead, stored within database 114 and/or otherwise. In some embodiments, accessing the second merchant data may be performed to compare the first merchant data with the second merchant data.

The merchant data may include data associated with merchants. While various attributes may be used depending on the objects being compared, some embodiments of the merchant data may include one or more attributes directed to merchant identification, contact or relationship management. For example, the merchant data may include identification data (e.g., name), contact data (e.g., phone number, website, email), address data (e.g., street address, city, state, country, zip code, etc.), among other things. In some embodiments, portions of the merchant data may be defined by attributes. For example, a merchant data record may include a name attribute, one or more address attributes, a phone number attribute, and a webpage URL attribute. Where available (e.g., input by an operator that creates or updates the record), an attribute of a merchant data record may include an attribute value of the merchant.

FIG. 5 shows an example of merchant data 500 in accordance with some embodiments. Merchant data 500 includes a set of merchant data, namely merchant data 502 and merchant data 504. With respect to method 300, merchant data 502 may be an example of the first merchant data accessed at 302 and merchant data 504 may be an example of the second merchant data accessed at 304. Each of merchant data 502 and 504 may include attribute values for each of name attribute 506, address line 1 attribute 508, address line 2 attribute 510, phone number attribute 512, and webpage URL attribute 514.

Returning to FIG. 3 and at 308, the server may be configured to determine a match score based the first merchant data and the second merchant data indicating a likelihood of the first merchant being the same as the second merchant. As discussed above, in some embodiments, the match score may be configured or calibrated to scale from 0 to 1, with 0 being highest mismatch and 1 being highest (e.g., complete) match, for two instances of input merchant data being compared. Here, the match score may be determined to be a value between 0 and 1. However, other scoring ranges, scales, or values may be used.

In some embodiments, the match score may be determined based on comparing corresponding attributes of the first merchant data and the second merchant data. For example and with reference to FIG. 5, name address line 1 attribute 508 may be determined for merchant data 502 and merchant data 504. Next, a similarity score may be determined for address line 1 attribute 508. For example, "200 Aspen Street" of merchant data 502 may be compared with "200 S. Aspen St." of merchant data 504. Because address data (e.g., as well as other attributes) can come in many forms (e.g., Street vs. St., Aspen vs. S. Aspen), the server may be configured to use natural language processing techniques to incorporate fuzzy matching in determining the similarity score. A similarity score may be determined for each of the corresponding attributes of the first merchant data and the second merchant data. The match score may then be determined based on one or more of the similarity scores, such as based on applying each of the similarity scores associated with the attributes to a relationship and/or function determined by the radial basis function support vector machine algorithm.

In some embodiments, the server may be configured to determine, based on merchant data training sets, a relationship between similarity scores associated with each of the one or more attributes and the match score. A merchant data training set may include two instances of merchant data that are known to be either a match or a mismatch. The radial basis function support vector machine algorithm may be configured to, based on the merchant data training sets, determine a non-linear boundary for the merchant data based on similarity scores of the corresponding attributes in training data. In that sense, the server is capable of machine learning a relationship between similarity scores of attributes and the match score (e.g., indicating the likelihood that two merchants match based on the attributes). In that sense, at 308, the server may be configured to determine the match score based on the relationship between the similarity scores and the match score, such as may be determined by machine learning.

The radial basis function support vector machine algorithm and merchant data training sets may allow the system to discover trends or patterns in how attribute values of attributes may vary. Some variances which may significantly alter the likelihood of two merchant data records being matching while other variances may be less important, which is reflected in the match score. Various trends or patterns, which may be programmatically discovered or determined, are described below.

FIGS. 5-8 show examples of merchant data in accordance with some embodiments. Merchant data 500 of FIG. 5 may be an example of two different instances of merchant data 502 and 504 as discussed above. Merchant data 502 and 504 also serves as an example of a merchant data training set, or merchant data training set 500. Similarly, FIGS. 6-8 show example merchant data training sets 600-800.

With reference to FIG. 5, merchant data 502 and 504 may be an example of a merchant data training set that includes matching merchant data (and/or merchant data associated with the same merchant), despite different word ordering in name attribute 502, no phone number for merchant data 504, abbreviation or other minor differences in address line 1 attribute 506 (e.g., omission of the "S" and including "Street" instead "St" for merchant data 502 relative to merchant data 504), and different URL addresses for webpage URL attribute 514 (e.g., but same domain name).

With reference to FIG. 6, showing a German language example of merchant data training set 600, merchant data 602 and 604 may be an example of a merchant data training set that includes unmatching merchant data (and/or merchant data associated with the different merchants). Here, merchant data 602 and 604 share the same address attributes 608 and 610 and "cosmetics" in name attribute 606. However, a shopping mall or the like may include many merchants that share the same address. As such, the match in address attributes 608 and 610 may be insufficient when name attribute 606 is different.

With reference to FIG. 7, showing a French language example of merchant data training set 700, merchant data 702 and 704 may be an example of a merchant data training set that includes matching merchant data. Here, although name attribute 706 for merchant data 702 includes "SPA" while name attribute 706 for merchant data 704 does not, they share similar address attributes 708 and 710 and website attribute 714. Furthermore, hotels often include spas and thus the omission of spa from hotel name (e.g., determined based on "hotel" in name attribute 706) may be less important.

With reference to FIG. 8, showing another French language example of merchant data training set 800, merchant data 802 and 804 may be an example of a merchant data training set that includes unmatching merchant data. Merchant data 802 describes a spa business for name attribute 806 while merchant data 804 describes a hotel business for name attribute 806. Both the spa and hotel have the same address and website. However, they have a distinct phone number which may indicate separate operations or merchants.

In some embodiments, one or more collections of merchant data training sets may be selected and/or generated such that the patterns or trends discussed above, among others, may be discovered by the radial basis function support vector machine algorithm.

Returning to method 300, in some embodiments, merchants of different countries (e.g., having merchant data stored in database 114) may be treated separately. The server may be configured to determine an attribute of merchant data as indicating a country. With reference to FIG. 5, for example, address line 2 attribute 510 for both merchant data 502 and merchant data 504 indicates that the two merchants (e.g., which may or may not be the same merchant) are located in the United States. The server may be further configured to determine similarity scores and/or match scores based on country.

For example, the merchant data training sets used for machine learning may be separated by country such that only merchants of matching countries are used for a training set. As such, the server may be capable of determining trends or patterns for matching separately for different countries. In some embodiments, different collections of merchant data training sets may be selected and/or generated for each country such that patterns or trends may be discovered by the radial basis function support vector machine algorithm for each country. Furthermore, determining match scores may include determining the applicable function or relationship between match scores and similarity scores of attributes for the country of the merchant data under consideration.

At 310, the server may be configured to determine a match score threshold. The match score threshold may be a value that distinguishes matching match scores (e.g., closer to 1) from nonmatching match scores (e.g., closer to 0). Where match scores are scaled from 0 to 1, for example, the match score threshold may be set to a value greater than 0 but less than 1.

A match score threshold of 0.5, for example, may indicate a match score greater than 0.8 for two instances of merchant data may indicate a match for the two instances of merchant data while a match score of less than 0.5 may indicate a mismatch for the two instances of merchant data. In some embodiments, the match score threshold may be configured to the be set to a lower value (e.g., 0.4) such that matching is more aggressive, thereby allowing more match scores above the match score threshold to be identified as being matches. As a result, a unique merchant (e.g., mismatch to one or more other merchant data) may be determined with a higher level of certainty. However, when set to a very low value (e.g., 0.1), the match score threshold may be too restrictive, resulting in the identification of matches that should be mismatches.

At 312, the server may be configured to determine whether the match score exceeds match score threshold. The match score determined at 308 may be compared with the match score threshold determined at 310.

In response to determining that the match score exceeds the match score threshold, method 300 may proceed to 314, where the server may be configured to determine the first merchant as being a match with the second merchant. For example, where the match score threshold is 0.4, a match score of 0.6 (e.g., exceeding 0.4) may indicate that the first merchant is a match with the second merchant.

Returning to 312, in response to determining that the match score fails to exceed the match score threshold, method 300 may proceed to 316, where the server may be configured to determine the first merchant as being different from the second merchant. For example, where the match score threshold is 0.4, a match score of 0.3 (e.g., failing to exceed 0.4) may indicate that the first merchant is different from the second merchant. Method 300 may then proceed to 318 and end.

FIG. 4 shows an example of a method of determining a unique contact in accordance with some embodiments. Method 400 may be performed for an instance of merchant data under consideration (e.g., merchant data associated with a potential lead) to determine whether the merchant data describes a unique merchant relative to other merchants. In some embodiments, the other merchants may be known contacts (e.g., stored within contact database 118), identified as other potential leads (e.g., at potential leads 120), and/or neither identified as contacts nor potential leads but stored within merchant data 116. Depending on the status of the other merchants and whether or not their associated merchant data matches, appropriate action may be taken to build a collection of unique contacts.

Method 400 may begin at 402 and proceed to 404, where the server may be configured to determine merchants as being potential leads based on merchant data. For example, one or more merchants (e.g., instances of merchant data) may be identified a pool of merchants, such as may be stored as merchant data 116 within database 114. In some embodiments, potential leads may be determined as merchants that are of high value and/or otherwise suitable for contact. For example, a merchant quality score for a merchant may be determined based on a variety of factors such as: capability of the merchant to meet demand at a geographic area, capability of the merchant to meet demand for an item, consumer evaluations of the merchant, and/or among other things. The server may be configured to determine whether a merchant is a potential lead based on merchant data (e.g., the name attribute) and/or other merchant information. The merchant information, for example, may be part of the merchant data 116 stored in database 114. Additionally or alternatively, the merchant information may be determined from any other source, such as communications with merchants, consumers, third party systems (e.g., merchant review webpages, product reviews, ratings, etc.), the Internet, etc.

In some embodiments, the merchant data within contacts database 118 (and/or duplicates of such data within merchant data 116) may be removed or filtered from the pool of merchant data that can serve as potential lead candidates. For example, a merchant within contacts database 118 may be already a contact and therefore should not be a potential lead for addition within contacts database 118.

At 406, the server may be configured to access merchant data associated with a first merchant determined to be a potential lead. For example, an instance of merchant data determined to be a potential lead may be stored as a potential lead 120 in database 114. Alternatively or additionally, each instance of merchant data determined to be a potential lead may be associated with a suitable status indicator or the like. The server may be configured to access merchant data associated with a potential lead from database 114, or other suitable memory.

At 408, the server may be configured to determine match scores indicating a likelihood of the first merchant being the same as each of a plurality of merchants. The plurality of merchants, for example, may include some or all of the merchants with merchant data stored in database 114. For each merchant being compared, the server may determine a match score indicating the likelihood of the first merchant being the same as the merchant being compared. The discussion at 308 of method 300 may be applicable at 408.

At 410, the server may be configured to determine a match score threshold. The discussion at 310 of method 300 may be applicable at 410.

At 412, the server may be configured to determine whether each of the match scores exceeds the match score threshold. The discussion at 312 may be applicable at 412.

In response to determining that each of the match scores fails to exceed the match score threshold, method 400 may proceed to 414, where the server may be configured to determine the first merchant as being different from the plurality of merchants. The discussion at 316 may be applicable at 414. In that sense, method 300 may be repeated for the first merchant and multiple other merchants to determine whether the first merchant is a match to any of the multiple merchants.

At 416, the server may be configured to determine the first merchant as being a unique contact. For example, if the first merchant is compared with all merchant data 116 within database 114 (e.g., including the merchants and merchant data within contacts database 118) and determined to be different or not a match to any of the other merchants, then server may identify the first merchant data and/or first merchant as being a unique contact. In some embodiments, the first merchant data may be added to contacts database 118 and/or otherwise flagged as being associated with a contact.

Returning to 412, in response to determining that at least one of the match scores exceeds the match score threshold, method 400 may proceed to 418, where the server may be configured to determine the first merchant as being a match with a second merchant. For example, the match score determined based on the first merchant data and merchant data of the second merchant may exceed the match score threshold. Therefore, the first merchant and the second merchant may be determined to be a match. In some embodiments, the server may be configured to determine the first merchant as being a match to one or more other merchants based on associated match scores (e.g., determined based on the first merchant data and merchant data of each of the one or more other merchants) exceeding the match score threshold.

As discussed at 420-430 of method 400 below, when the first merchant is determined to be a match to the second merchant, the server may be configured to perform various actions for the first merchant data depending on the status of the second merchant. For example, the second merchant data may be a potential lead (e.g., determined at 404), a contact (e.g., stored within contacts database 118), or simply merchant data within database 114 that is neither a contact nor a determined to be a potential lead.

At 420, the server may be configured to determine whether the second merchant is a potential lead. For example, the second merchant may be determined to be a potential lead as discussed at 404.

In response to determining that the second merchant is a potential lead, method 400 may proceed to 422, where the server may be configured to determine the first merchant and the second merchant as being a single merchant. As such, two instances of merchant data identified as potential leads may be determined to be referring to the same single merchant.

At 424, the server may be configured to determine the single merchant as a unique contact. For example, some or all of first merchant data and/or the second merchant data may be stored within contacts database 118. However, only a single instance of merchant data or contact may be stored in contacts database 118 such that a duplicate, non-unique merchant is not added to contacts database 118.

In some embodiments, steps 418-420 may be repeated for the first merchant data and each instance of merchant data that is determined to be a match. For example, all of the matching potential leads may be determined to be a single merchant. In some embodiments, the server may be configured to construct a graph and/or linked data of potential leads where nodes are the potential leads and edges between the nodes define the matching potential leads. Connected components of the graph may comprise of matching potential leads. The server may then choose merchant data from one of the nodes for injection into contacts database 118.

In some embodiments, the server may be configured to utilize a potential lead threshold for the comparison at 412 for each instance of merchant data of the plurality of merchants compared with the first merchant data that is a potential lead. The potential lead threshold may be different from (e.g., general) the match score threshold. For example, the potential lead threshold may be set to a lower level such that two potential leads are more likely to match than a potential lead and a contact having the same match scores, or vice versa.

Returning to 420, in response to determining that the second merchant fails to be a potential lead, method 400 may proceed to 426, where the server may be configured to determine whether the second merchant is a contact. For example, the second merchant may be a contact when the associated second merchant data is stored and/or retrieved from contacts database 118 and/or otherwise flagged as a contact.

In some embodiments, the server may be configured to utilize a contact threshold for the comparison at 412 for each instance of merchant data of the plurality of merchants compared with the first merchant data that is a contact. The contact threshold may be different from (e.g., general) the match score threshold and/or potential lead threshold. For example, the contact threshold may be set to a lower level such that a potential lead and a contact are more likely to match than the potential lead and a second potential lead having the same match scores, or vice versa.

In response to determining that the second merchant is a contact, method 400 may proceed to 428, where the server may be configured to determine the first merchant as being the contact. For example, the first merchant and the second merchant may be determined to be same merchant. Because the second merchant is already a contact, the first merchant data does not need to be added contacts database 118. However, in some embodiments, such as when the first merchant data includes attribute values for an attribute that is missing in the contacts database 118, some or all of the first merchant data may be added to the existing contact record. In some embodiments, attributes from different but matching merchant data may be merged into a single record. Furthermore, any associated merchant information (e.g., ratings, reviews, merchant category, service information etc.) may also be merged into a single record. In some embodiments, the selection of merchant data attribute values for a single record may be determined based on the quality of the source for each instance of merchant data. For example, data from a high quality sources (e.g., provided by the merchant, entered by an operator, etc.) can be selected in place of data from lower quality source (e.g., OCR documents, third party sources, etc.) to increase the accuracy of the merchant data within the record (e.g., at contacts database 118).

Returning to 426, in response to determining that the second merchant fails to be a contact (e.g., and also a potential lead at 420), method 400 may proceed to 430, where the server may be configured to determine the first merchant as being a unique contact. The second merchant data may be merchant data that is stored in database 114 and not in contacts database 118. Because the second merchant data was also not determined to be associated with a potential lead (e.g., at 420), the first merchant data may be injected into contacts database 118 without any risk of duplication.

In some embodiments, steps 404-430 may be performed for each merchant determined as being a potential lead at 404. For example, unique merchants identified as potential leads may be added to the contacts database while merchants that match a merchant within the contacts database may not be added. As such, the contents of the contacts database 118 may be programmatically updated to include unique contacts based on entity resolution of a pool of merchant data. Method 400 may then proceed to 432 and end.

Match Result Error Detection and Correction

FIG. 9 shows an example of a method 900 of error detection and correction for a programmatic match result in accordance with some embodiments. Method 900 may be performed to provide continuous data and model improvement. The binary classification techniques and algorithms discussed herein may be improved to provide more reliable contact databases, such as contact databases where each entry is known to be a unique contact, without duplication, and without omission of relevant instances of merchant data describing the unique contact. As such, the system is able to better collect and manage merchant data (e.g., which may be stored in the merchant database, updated at various times from various sources, etc.), thereby resulting in a more efficient (e.g., faster lookup times) and reliable contacts database.

For example, the server may be configured to determine a match result for two instances of merchant data such as by performing the match score algorithm discussed in method 300 and/or using any other suitable technique. The server may be further configured to determine one or more error scores associated with the match result. Where the error scores indicate a potential error in the match result, the server may provide the two instances of merchant data to a user interface or otherwise to a user for user determination of a user match result. The contacts database may then be updated based on the user match result (e.g., as discussed in method 400), which may agree or disagree with the programmatically determined match result. The two instances of merchant data, along with the user determination, may also be used as a merchant data training set for improvement of the modeling data and matching algorithm (e.g., the radial basis function support vector machine algorithm).

Method 900 may begin at 902 and proceed to 904, where the server may be configured to perform method 300 to determine a match result indicating whether or not first merchant data is a match with second merchant data. The match result may indicate that the first merchant data is a match with the second merchant data such that both the first and second merchant data describe the same merchant or contact, as discussed in greater detail at 314 of method 300. Alternatively, the match result may indicate that the first merchant data fails to be a match with the second merchant data such that the first merchant data and the second merchant data describe different merchants, as discussed in greater detail at 316 of method 300

At 906, the server may be configured to determine whether the first merchant data is match with the second merchant data. For example, the determination may be based on the match result. As discussed in method 300, the match result may be determined based on determining a match score based on the first merchant data and the second merchant data indicating a likelihood of the first merchant being the same as the second merchant, determining a match score threshold, and determining whether the first merchant is a match with the second merchant based on whether or not the match score exceeds the match score threshold. Additionally or alternatively, the server may be configured to determine the match result using any other suitable technique.

In some embodiments, each match result can be assessed to identify what might be errors in precision (false positives) or recall (false negatives). If the server detects what might be an error, it may send the first and second merchant data to be annotated by a user. The user's true label or match result can be incorporated into the data store and used as training data to improve the machine learning model.

In response to determining that the first merchant data is a match with the second merchant data, method 900 may proceed to 908, where the server may be configured to determine a precision error score associated with the match result. Errors in precision may result in the improper merging of two instances of merchant data together as a single merchant or contact that should not be merged together. The precision error score may indicate a likelihood or probability that the match result indicating the merge was improper.

In some embodiments, the precision error score may be determined based on a measurement of consensus with multiple instances of merchant data associated with the same merchant or unique contact. For example, in response to determining that the first merchant data matches the second merchant data and that the second merchant data is associated with a particular merchant, the server may be configured to determine whether the first merchant data matches or corresponds with one or more other instances of merchant data (e.g., different from the second merchant data) associated with the merchant. Each of the other instances of merchant data of the unique contact, for example, can be stored as merchant data 116 within database 114.

In some embodiments, the server may be configured to use a consensus algorithm to determine the precision error score. The consensus algorithm may compare the first merchant data with other instances of merchant data associated with the merchant. In some embodiments, the consensus algorithm may use method 300 to determine match results between the first merchant data and the other instances of merchant data associated with the unique contact. The precision error score may then be determined based on the match results. A higher precision error score may indicate that the match result determined at 904 has a greater probability of error. For example, the match results may indicate that the first merchant data fails to be a match and/or has low match scores (e.g., below a match score threshold) with the other instances of merchant data associated with the matched merchant. Thus even though the first and second merchant data are determined to match at 906, the precision error score may indicate that this match has a high probability of error. Similarly, a lower precision error score may indicate that the match result has a lower probability of error. The match results may indicate that the first merchant data is a match and/or has high match scores (e.g., below a match score threshold) with the other instances of merchant data. Thus the precision error score may indicate that the match between the first merchant data and the second merchant data determined at 906 has a low probability of error.

At 910, the server may be configured to determine whether the precision error score indicates a possible precision error with the match result. For example, the server may be configured to determine a precision error score threshold and compare the precision error score with the precision error score threshold to determine whether the precision error score indicates a possible error. The precision error score threshold may indicate a minimum precision error score that is required for the server to determine a possible error in precision. In some embodiments, the precision error score threshold may be configurable to manage the number of possible precision errors being detected and sent for user consideration. For example, a lower precision error score threshold may be set to detect more possible errors in precision to result in a lower chance of false positive matches.

In response to determining that the precision error scale fails to indicate a possible error, method 900 may proceed to 912, where the server may be configured to determine/confirm the first merchant data matches with the second merchant data. Similarly, the server may determine a first merchant of the first merchant data and a second merchant of the second merchant data as being a single merchant. The discussion at 422 and 424 of method 400 may be applicable at 912.

At 914, the server may be configured to update a contacts database. For example, the first merchant data and/or second merchant data may be injected into contacts database 118 as a unique contact.

Returning to 910, in response to determining that the precision error scores indicates a possible error, method 900 may proceed to 920, where the server may be configured to determine a user match result indicating whether the first merchant data is a match with the second merchant data. In some embodiments, the server may be configured to provide a user interface for user determination of the match result. The user interface may include an indication of the first merchant data and the second merchant data, such as merchant data 500 including first merchant data 502 and second merchant data 504 shown in FIG. 5. The user interface may further include a match result entry, selection, etc. that allows the user to input the user match result indicating whether or not the first merchant data matches the second merchant data. The server may be further configured to determine the user match result based on the user input.

At 922, the server may be configured to generate a merchant data training set based on the user match result, the first merchant data, and the second merchant data. For example, the merchant data training set may include the user match result, the first merchant data, and the second merchant data.

At 924, the server may be configured to determine, based on merchant data training set, an updated relationship between similarity scores of attributes and the match score. As such, the merchant data training set may be applied to train the match score algorithm. As discussed above, merchant data training sets may include two instances of merchant data that are known to be either a match or a mismatch. The updated relationship may be used to determine match scores based on similarity scores of attributes as input, such as discussed at 308 of method 300.

In some embodiments, server may be configured to use a radial basis function support vector machine algorithm and the merchant data training sets to determine a non-linear boundary indicating the relationships between similarity scores of each of the attributes of two instances of merchant data and match scores. In that sense, method 900 may allow for programmatic match results having a high probability of error to be corrected by a human, and further may allow for human determined match results to be used in merchant data training sets for continuous merchant data and match scoring model improvement.

In some embodiments, the server may be configured to collect and/or store a plurality of merchant data training sets. The server may be further configured to determine the updated relationship based on applying each of the plurality of merchant data training sets to the radial basis function support vector machine algorithm. In some embodiments, the server may include a retrain model component or module configured to determine the updated relationship or model. New candidate models can be applied to the merchant data training sets, and predictions can be compared to truth. Candidate models or relationships whose predictions most closely resemble "truth" can then be deployed to runtime.

At 926, the server may be configured to update the contacts database based on the user match result. For example, where the user match result indicates that the first merchant data and the second merchant data describe the same merchant, the first merchant data and/or second merchant data may be injected into contacts database 118 as a unique contact. In another example, where the user match result indicates that the first merchant data and the second merchant data describe the different merchants, the first merchant data and the second merchant data may be injected into contacts database 118 each as a unique or different contacts. The discussion in method 400 regarding updating the contact database based on match results may be applicable at 926.

Returning to 906, in response to determining that the first merchant data fails to match with the second merchant data (e.g., based on the match result determined at 904), method 900 may proceed to 916, where the server may be configured to determine a recall error score associated with the (e.g., programmatically determined) match result. Errors in recall may result in the failure to merge two instances of merchant data of a single merchant as a single merchant. The recall error score may indicate a likelihood or probability that the match result indicating that the first and second merchant data fail to match was improper, that the first and second merchant data actually describe the same merchant or contact.

In some embodiment, the recall error score may be determined based on probabilistic estimate of how likely it is that the first merchant data matches to other instances of merchant data (e.g., different from the second merchant data, associated with unique contacts). For example, where the first merchant data matches more closely with the second merchant data than another instance (e.g., all other instances) of merchant data, the recall error score may be higher and indicate a higher likelihood that the failure to match the first and second merchant data was improper. In another example, where the first merchant data matches one or more other instances of merchant data better than the second merchant data, the recall error score may be lower and indicate a lower likelihood that the failure to match the first and second merchant data was improper.

At 918, the server may be configured to determine whether the recall error score indicates a possible recall error with the match result. For example, the server may be configured to determine a recall error score threshold and compare the recall error score with the recall error score threshold to determine whether the recall error score indicates a possible error. The recall error score threshold may indicate a minimum recall error score that is required for the server to determine a possible error in recall. In some embodiments, the recall error score threshold may be configurable to manage the number of possible recall errors being detected and sent for user consideration. For example, a lower recall error score threshold may be set to detect more possible errors in recall to result in a lower chance of false positive matches.

In some embodiments, the precision and/or recall error score error detections may be configurable to manage the number of possible errors being provided to users to generate user match results. For example, if errors in precision are more harmful to the contacts database (e.g., more costly or time consuming to correct, more harmful to business operations, etc.), the precision error score threshold may be set to detect more possible errors in precision to ensure that those possible errors undergo user review. Similarly, the recall error score threshold may be set lower or higher, depending on the suitable balance between requesting more user inputs and allowing for a higher chance of error in a programmatic match result.

In some embodiments, the determination as to whether to determine and/or request a user match result may be additionally or alternatively based on one or more other factors. Some example factors may include a merchant score defining an importance of the merchant or contact (e.g., based on some category/service, region, quality), a user correction probability score indicating an estimate of a probability that a human can correct the error (e.g., based on determining the completeness of the attributes of the first and second merchant data), among other things.

In response to determining that the recall error score indicates a possible recall error, method 900 may proceed to 920, where the server may be configured to determine a user match result indicating whether the first merchant data is a match with the second merchant data. The server may then generate merchant data training set based on the user match result, the first merchant data and second merchant data at 922. The server may determine, based on merchant data training set, an updated relationship between similarity scores of attributes and the match score at 924. The server may further update the contacts database based on the user match result at 926.

Returning to 918, in response to determining that the recall error score fails to indicate a possible recall error, method 900 may proceed to 928, where the server may be configured to confirm/determine the first merchant data as failing to be a match with the second merchant data. At 930, the server may be configured to update the contacts database. For example, the server may store the first merchant data or second merchant data as a unique contact within the contact database, as discussed in method 400. Method 900 may then proceed to 932 and end.

FIG. 10 shows an example of a method 1000 of determining a match score threshold based on error detection and user correction in accordance with some embodiments. As discussed above, there are two types of errors that the programmatic math result can make: a false positive error or a false negative error. The false positive error occurs upon predicting that two entities (e.g., instances of merchant data) should be merged together (e.g., as a unique contact) when in reality, they describe separate entities. This is an error in precision. The false negative error occurs upon failing to predict that two entities should be merged together, when in reality, they describe the same entity. This is an error in recall.

In any data integration system, there will be costs involved with both types of error made by the system, such as the cost of quality in contact database and the (e.g., monetary, time, etc.) cost of identifying and fixing such errors. The cost associated with one type of error may be more expensive than the cost of the other.

As discussed above in the match score algorithm of method 300, the match scores may define a probabilistic estimate of whether two entities match. If that probability exceeds a match score threshold, the server may be configured to determine that the two instances of merchant data match, and that the merchant data may be merged into one canonical representation of that entity (e.g., a unique contact in the contact database). If the match score fails to exceed the match score threshold, the server may be configured to determine that the two instances of merchant data fail to match, and that the first merchant data and/or second merchant data should exist as its own entry in the contact database. Via method 1000, the match score threshold may be dynamically tuned to continually meet expectations, requirements, and/or targets for the ratio between false positives and false negatives (e.g., the ratio defining the relative costs of errors in precision versus recall).

Method 1000 may begin at 1002 and proceed to 1004, where the server may be configured to determine a match score indicating a likelihood of first merchant data being a match with second merchant data. The match score may be determined programmatically and may be used to determine a programmatic match result. The discussion at 308 of method 300 may be applicable at 1004. Method 1000 may be performed with some or all of the other methods discussed herein, such as in addition or alternative to method 900.

At 1006, the server may be configured to determine a match score threshold. In some embodiments, the match score threshold may be a predetermined value that is stored in a memory or database, and accessed by the server at 1006. As discussed in greater detail below, the match score threshold may be adjusted based on determining error scores of programmatic match results.

At 1008, the server may be configured to determine whether the (e.g., programmatic) match score exceeds the match score threshold. The discussion at 310 and 312 of method 300 may be applicable at 1006 and 1008. As discussed, a match score exceeding the match score threshold may indicate that the first and second merchant data are describe and/or are otherwise associated with the same merchant. Conversely, a match score that fail to exceed the match score threshold may indicate that the first and second merchant data describe and/or are associated with different merchants.

In response to determining that the match score exceeds the match score threshold, method 1000 may proceed to 1010, where the server may be configured to determine a precision error score for the match result. The discussion at 908 and 910 of method 900 may be applicable at 1010. Returning to 1008, in response to determining that the match score fail to exceed the match score threshold, method 1000 may proceed to 1012, where the server may be configured to determine a recall error score for the match result. The discussion at 916 and 918 of method 900 may be applicable at 1012.

At 1014, the server may be configured to determine a user match result. The user match result may be requested or otherwise determined to be needed based on the precision error score or the recall error score, such as by comparing the error scores to one or more error score thresholds. The discussion at 920 of method 900 may be applicable at 1014. As discussed above, various steps of method 900 may also be performed in method 1000. For example, if the precision error score or recall error score indicate a lack of error, the programmatic match result may be used to update the contacts database. In another example, the user match result may also be used in method 1000 to update the contacts database.

In some embodiments, steps 1004-1014 may be repeated for multiple instances of merchant data until a statistically significant sample of associated programmatic match results and user match results are generated. Once enough data to estimate precision and recall error rates has been collected, method 1000 may proceed to 1016.

At 1016, the server may be configured to determine a precision error rate based on programmatic match results and user match results. As discussed above, a precision error is caused by predicting that two entities should be merged together when in reality, they describe separate entities. Thus the precision error rate may define a rate user match results indicate a mismatch out of all programmatic match results that were determined to be a match.

At 1018, the server may be configured to determine a recall error rate based on programmatic match results and user match results. As discussed above, a recall error is caused by failing to predict that two entities should be merged together, when in reality, they describe the same entity. Thus the recall error rate may define a rate user match results indicate a match out of all programmatic match results that were determined to be a mismatch.

At 1020, the server may be configured to determine an estimated precision/recall error ratio (or p/r error ratio) based on the precision error rate and the recall error rate. The estimated p/r error ratio may be determined, for example, as the precision error rate divided by the recall error rate, or vice versa (e.g., where recall/precision error ratios are used).

At 1022, the server may be configured to determine an expected precision/recall error ratio. The expected p/r error ratio may define an expected, required, desirable and/or targeted value for the precision error rate relative to the recall error rate. In some embodiments, the expected p/r ratio may be determined based on the relative costs of making an error in precision versus recall. For example, a higher expected p/r ratio corresponds with a higher error rate in precision than recall. Conversely, a lower p/r ratio corresponds with greater error rate in recall than precision. The server may be configured to determine the expected precision/recall error ratio based on minimizing a cost value (e.g., monetary and/or temporal) as function of the precision error rate and recall error rate.

At 1020, the server may be configured to determine an updated match score threshold such that the estimated precision/recall error ratio matches the expected precision/recall error ratio. The updated match score threshold may be used to determine subsequent programmatic match results, such as discussed at 1006.

In some embodiments, determining the updated match score threshold may include adjusting the (e.g., prior) match score threshold a predetermined (e.g., constant) amount. For example, the match score threshold may be increased to prioritize precision accuracy over recall accuracy. In another example, the match score threshold may be decreased to prioritize recall accuracy over precision accuracy. The server may be configured to incrementally increase the match score threshold, compare the resulting estimated p/r error ratio with the expected p/r error ratio, make any further adjustments based on the comparison, and so forth.

In some embodiments, the server may be configured to use gradient descent, simulated annealing, Newton's method, and/or some other function optimization procedure to minimize the difference between the estimated p/r error ratio and expected p/r error ratio as a function of the match score threshold. Method 1000 may then proceed to 1022 and end.

CONCLUSION

Many modifications and other embodiments will come to mind to one skilled in the art to which the embodiments discussed herein pertain having the benefit of the teachings presented in the foregoing descriptions and the associated drawings. For example, while techniques discussed herein are directed to determining unique merchants based on merchant data and attributes, they may be extended to determining unique objects based on object data and attributes of the objects. Therefore, it is to be understood that the embodiments contemplated herein are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for improving precision accuracy and/or recall accuracy of a match score algorithm, wherein the apparatus comprises a processor and a non-transitory memory storing program instructions, wherein the non-transitory memory and the program instructions are configured to, with the processor, cause the apparatus to:
  determine a plurality of programmatic match results based at least in part on applying the match score algorithm on merchant data, wherein the match score algorithm indicates a match score threshold;
  determine a precision error rate and a recall error rate based at least in part on the plurality of programmatic match results and a plurality of user match results, wherein the plurality of user match results are based on user input;
  determine an estimated precision/recall error ratio based at least in part on the precision error rate and the recall error rate;
  determine an expected precision/recall error ratio associated with the plurality of programmatic match results; and
  implement an optimization algorithm to incrementally adjust the match score threshold of the match score algorithm to minimize a difference between the estimated precision/recall error ratio and the expected precision/recall error ratio.

2. The apparatus of claim 1, wherein the non-transitory memory and the program instructions are configured to, with the processor, cause the apparatus to:
  determine whether a programmatic match result of the plurality of programmatic match results indicates that first merchant data of the merchant data is a match associated with second merchant data of the merchant data.

3. The apparatus of claim 2, wherein the non-transitory memory and the program instructions are configured to, with the processor, cause the apparatus to:
  in response to determining that the first merchant data is the match associated with the second merchant data:
    determine a precision error score, wherein the precision error score indicates whether the programmatic match result is associated with a precision error; and
    in response to determining that the precision error score indicates that the programmatic match result is associated with the precision error, determine a user match result of the plurality of user match results.

4. The apparatus of claim 2, wherein the non-transitory memory and the program instructions are configured to, with the processor, cause the apparatus to:
  in response to determining that the first merchant data is not the match associated with the second merchant data:
    determine a recall error score, wherein the recall error score indicates whether the programmatic match result is associated with a recall error; and
    in response to determining that the recall error score indicates that the programmatic match result is associated with the recall error, determine a user match result of the plurality of user match results.

5. The apparatus of claim 1, wherein, when adjusting the match score threshold of the match score algorithm, the non-transitory memory and the program instructions are configured to, with the processor, cause the apparatus to:
  incrementally adjust the match score threshold by a predetermined amount.

6. The apparatus of claim 1, wherein the non-transitory memory and the program instructions are configured to, with the processor, cause the apparatus to:
  determine the expected precision/recall error ratio based at least in part on minimizing a cost value as a function of the precision error rate and the recall error rate.

7. The apparatus of claim 1, wherein, when adjusting the match score threshold of the match score algorithm, the non-transitory memory and the program instructions are configured to, with the processor, cause the apparatus to:
  utilize an optimization procedure to minimize a difference between the estimated precision/recall error ratio and the expected precision/recall error ratio as a function of the match score threshold.

8. A computer-implemented method for improving accuracy of a match score algorithm comprising:
  determining a plurality of programmatic match results based at least in part on applying the match score algorithm on merchant data, wherein the match score algorithm indicates a match score threshold;
  determining a precision error rate and a recall error rate based at least in part on the plurality of programmatic match results and a plurality of user match results, wherein the plurality of user match results are based on user input;
  determining an estimated precision/recall error ratio based at least in part on the precision error rate and the recall error rate;
  determining an expected precision/recall error ratio associated with the plurality of programmatic match results; and
  implementing an optimization algorithm to incrementally adjust the match score threshold of the match score algorithm to minimize a difference between the estimated precision/recall error ratio and the expected precision/recall error ratio.

9. The computer-implemented method of claim 8, further comprising:
  determining whether a programmatic match result of the plurality of programmatic match results indicates that first merchant data of the merchant data is a match associated with second merchant data of the merchant data.

10. The computer-implemented method of claim 9, further comprising:
  in response to determining that the first merchant data is the match associated with the second merchant data:
    determining a precision error score, wherein the precision error score indicates whether the programmatic match result is associated with a precision error; and
    in response to determining that the precision error score indicates that the programmatic match result is associated with the precision error, determining a user match result of the plurality of user match results.

11. The computer-implemented method of claim 9, further comprising:
  in response to determining that the first merchant data is not the match associated with the second merchant data:
    determining a recall error score, wherein the recall error score indicates whether the programmatic match result is associated with a recall error; and
    in response to determining that the recall error score indicates that the programmatic match result is associated with the recall error, determining a user match result of the plurality of user match results.

12. The computer-implemented method of claim 8, wherein, when adjusting the match score threshold of the match score algorithm, the computer-implemented method further comprises:
  incrementally adjusting the match score threshold by a predetermined amount.

13. The computer-implemented method of claim 8, further comprising:
  determining the expected precision/recall error ratio based at least in part on minimizing a cost value as a function of the precision error rate and the recall error rate.

14. The computer-implemented method of claim 8, wherein, when adjusting the match score threshold of the match score algorithm, the computer-implemented method further comprises:
  utilizing an optimization procedure to minimize a difference between the estimated precision/recall error ratio and the expected precision/recall error ratio as a function of the match score threshold.

15. A computer program product for improving accuracy of a match score algorithm, wherein the computer program product comprises at least one non-transitory computer-readable storage medium having computer-readable program code portions stored therein, wherein the computer-readable program code portions comprise an executable portion configured to:
  determine a plurality of programmatic match results based at least in part on applying the match score algorithm on merchant data, wherein the match score algorithm indicates a match score threshold;
  determine a precision error rate and a recall error rate based at least in part on the plurality of programmatic match results and a plurality of user match results, wherein the plurality of user match results are based on user input;
  determine an estimated precision/recall error ratio based at least in part on the precision error rate and the recall error rate;
  determine an expected precision/recall error ratio associated with the plurality of programmatic match results; and
  implement an optimization algorithm to incrementally adjust the match score threshold of the match score algorithm to minimize a difference between the estimated precision/recall error ratio and the expected precision/recall error ratio.

16. The computer program product of claim 15, wherein the computer-readable program code portions comprise the executable portion configured to:
  determine whether a programmatic match result of the plurality of programmatic match results indicates that first merchant data of the merchant data is a match associated with second merchant data of the merchant data.

17. The computer program product of claim 16, wherein the computer-readable program code portions comprise the executable portion configured to:
  in response to determining that the first merchant data is the match associated with the second merchant data:
    determine a precision error score, wherein the precision error score indicates whether the programmatic match result is associated with a precision error; and
    in response to determining that the precision error score indicates that the programmatic match result is associated with the precision error, determine a user match result of the plurality of user match results.

18. The computer program product of claim 16, wherein the computer-readable program code portions comprise the executable portion configured to:
  in response to determining that the first merchant data is not the match associated with the second merchant data:
    determine a recall error score, wherein the recall error score indicates whether the programmatic match result is associated with a recall error; and
    in response to determining that the recall error score indicates that the programmatic match result is associated with the recall error, determine a user match result of the plurality of user match results.

19. The computer program product of claim 15, wherein, when adjusting the match score threshold of the match score algorithm, the computer-readable program code portions comprise the executable portion configured to:
  incrementally adjust the match score threshold by a predetermined amount.

20. The computer program product of claim 15, wherein the computer-readable program code portions comprise the executable portion configured to:
  determine the expected precision/recall error ratio based at least in part on minimizing a cost value as a function of the precision error rate and the recall error rate.

* * * * *